3,338,263
FLOW CONTROL VALVE DEVICE
Johannes Altmeppen and Horst Hinrichs, Hannover, Germany, assignors to Westinghouse Bremsen- und Apparatebau, G.m.b.H., Hannover, Germany
Filed May 11, 1965, Ser. No. 454,898
Claims priority, application Germany, May 16, 1964, W 36,807
3 Claims. (Cl. 137—493.7)

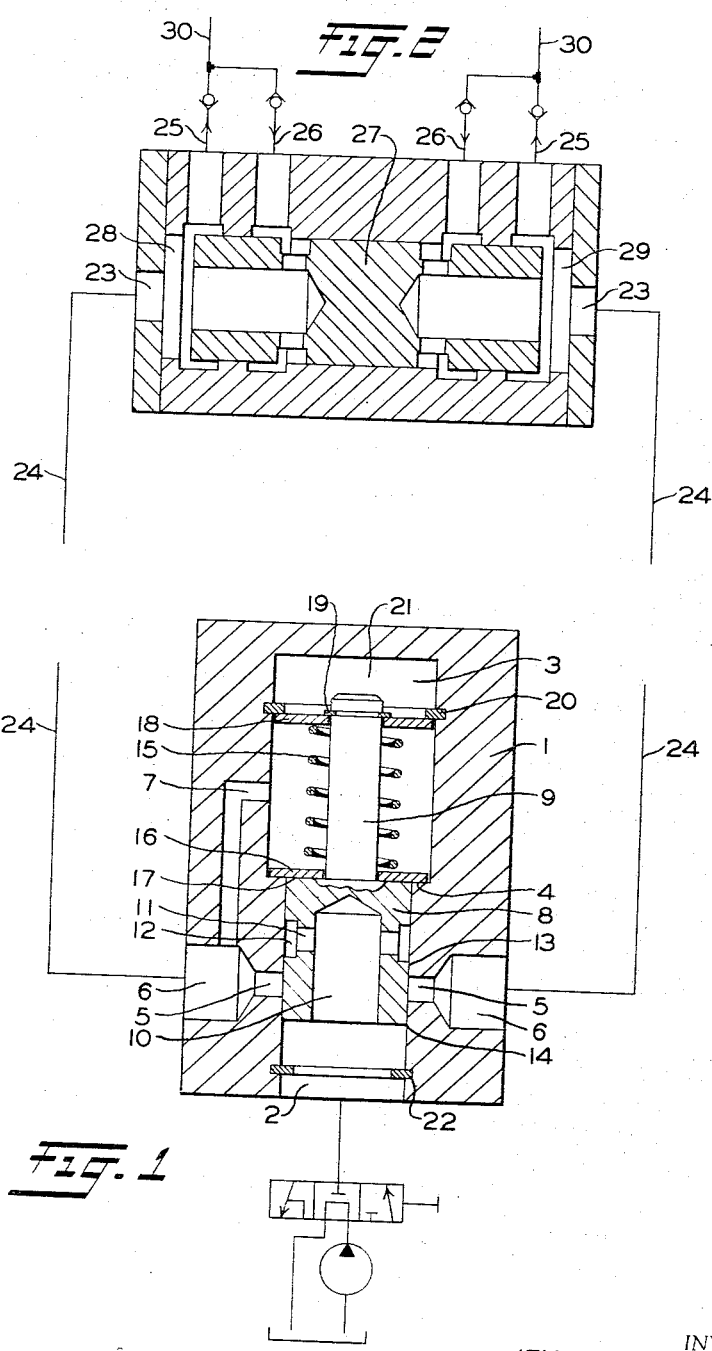

The invention relates to a flow control valve device for controlling flow regulators or for other regulation sequences with numerous outlets and with cross-section area alteration possible with respect to the close-off control slides.

Heretofore conventional flow control valves were not capable of holding the pressure differential constant at a predetermined value independently of the rate of flow and independently of the direction of the flow.

It is the object of this invention to provide a flow control valve having a predetermined pressure differential which is held constant with respect to all flows for which the choke valve is designed. In addition, this pressure differential is provided in both directions of flow through the valve, with provision for closing the valve when the flow is at zero.

In the present invention, this purpose is achieved by providing in a housing a control slide that chokes in both directions of flow, the slide operating as a hydraulic piston which has one side thereof that is subjected to the incoming pressure of the fluid medium and the other side thereof that is subjected to the pressure from the choked pressure fluid medium, the slide being loaded by means of a tension spring acting in a direction counter to the action of the incoming pressure. The slide or piston is partially hollow and is provided on its periphery, relative to both directions of flow, with a control edge by means of which the passages in the cylinder wall in which the piston is guided can be varied in cross-sectional area to constantly maintain the predetermined pressure differential.

This and other objects of the invention will be more readily apparent in the following description, taken in conjunction with the drawing, in which:

FIG. 1 is a sectional view of the fluid control valve of my invention;

FIG. 2 is a sectional view of a flow regulator which may be used in conjunction with invention of FIG. 1.

In the drawing, the fluid control valve includes a housing 1 containing a cylindrical chamber 2 coaxially disposed with a cylindrical chamber 3 having a larger diameter so that at the point of intersection of the two cylindrical chambers there is provided a shoulder 4. A pair of openings 5 having equal cross-sectional areas are disposed in diametrical opposition in the wall of cylindrical chamber 2, each opening communicating with a passage 6 in the housing 1. One of the passages 6 is connected by means of the passage 7 with the chamber 3. A control slide 8 serving as a hydraulic piston is disposed in an axially movable manner in the cylindrical chamber 2, and is securely attached to an axially disposed shaft 9. The slide includes a chamber 10 opening at the end of the slide opposite the shaft, and further includes a plurality of smaller diameter radial passages 11 leading from the chamber 10 inside the piston 8 into an annular groove 12 on the exterior of the piston. The lower edge 13 of the groove 12 as well as the lower end edge 14 of the piston 8 each comprises a control edge, with that portion of the cylindrical surface of the piston therebetween serving as a means to close off the openings 5 in the illustrated neutral position of the valve. Whenever the piston is axially displaced from the neutral position in either direction, the control edges 13 and 14 control the cross-sectional area of the interconnection between the passages 5 and 11 so as to comprise a choke having a variable cross-sectional area serving to intercommunicate openings 5 and cylindrical chamber 2.

A compression spring 15 is provided on the shaft 9 disposed between a disc 16 disposed against the piston shoulder 17 on the one end, and a disc 18 disposed against ring 19 on the end of shaft 9. An additional securing ring 20 is disposed in the wall of the cylindrical chamber 3 serving as an upper limit for disc 18. The inside distances in an axial direction between the shoulder 4 and the securing ring 20 is equal to the distance between the piston shoulder 17 and the securing ring 19 so that the tension of the spring 15 holds the piston 8 in the neutral position as shown. Therefore, the piston 8 can be displaced in both axial directions against the same spring force to the limits provided by the upper end 21 of chamber 3, and a ring 22 in chamber 2. In these upper and lower positions, the openings 5 are completely free and unchoked.

In the operation of the fluid control valve device, when the piston 8 is activated by an incoming fluid pressure in chamber 2, it is moved upwardly against the force of the spring 15 so that the control edge 14 of the piston opens the openings 5 by a small or larger amount depending upon the amount of pressure applied. The choked pressure which is built up in passage 6 is transmitted into the passage 7, and into the chamber 3. This choked pressure has a value that is determined by the free cross-sectional areas of the openings 5 which in turn is determined by position of the piston. The incoming pressure $P_1$ impinges against the lower end of piston 8 which lies in the cylinder chamber 2, whereas the other end, which has the same cross sectional area, is subjected to the action of the choked pressure $P_2$ in the cylinder chamber 3 as well as the force $P_f$ of the spring 15.

Therefore, the following is true for the position, the piston as determined by these balanced forces, as follows:

$$P_1 = P_2 + P_f$$

Accordingly, the pressure differential between the incoming pressure and the choked pressure is provided as follows:

$$\Delta P = P_1 - P_2 = P_f$$

The pressure differential is thus dependent only upon the spring force and can be thus determined by means of predetermined value. The established mathematical relationship serves for all of the cross-sectional areas of the openings 5 from the value zero up to the fully open cross-sectional area, that is to say, from zero flow of the fluid medium up to the maximum flow for which the choke valve is established. In this flow range the pressure differential is practically constant through the use of a sufficiently light spring as determined by the conditions of flow of fluid under pressure in which the choke cross-sectional area and therefore the fluid flow are variable.

The above described characteristics of the operation of the choke valve are also present when the direction of flow through the valve is reversed. In this case, the incoming pressure is provided in the passages 6 and in chamber 3. Therefore, the piston 8 moves downward against the force of the spring 15 so that now the control edge 13 opens the openings 5 in accordance with fluid pressure and connects them with chamber 2 by means of the radial passages 11 and chamber 10. For the same reasons given above, the pressure differential over the entire range of operation of the choke valve is constant.

Since the value of the pressure differential is determined by means of the spring 15, its strength can be selected so that the spring just overcomes the friction of the piston 8.

The maintaining of a constant pressure differential throughout the entire flow range of the valve device distinguishes the fluid control valve in a positive manner from previous chokes having non-variable orifices of fixed cross-sectional area, since, with the latter, the pressure differential increases with increasing flow. For example, in a flow divider, in order to overcome inherent resistance, it is necessary to select a minimum pressure differential. Since this pressure differential increases with increasing flow because of the fixed orifice cross-sectional area, undesirable pressure losses are obtained as the pressure differential increases, which losses can be partially alleviated by exchanging fixed chokes of different sizes for different ones of the various flow ranges. In contrast to this, the structure of the present invention renders unnecessary the exchanging of different fixed chokes, and at the same time also avoids the undesirable pressure losses over the entire flow range for which the fluid control valve has been designed.

An advantageous application in the use of the fluid control valve of the present invention is illustrated in the drawing showing a flow regulator in FIG. 2 thereof. The flow regulator is a combination of a flow divider with a flow combiner that also operates to regulate fluid flow in both directions of flow. For example, the regulator serves to equalize the travel of two unequally loaded fluid operated cylinders, not shown, in both directions of piston travel. Conventionally, devices of this type are equipped with two fixed choke orifices of predetermined cross-sectional area for determining flow capacity. These orifices are omitted from the flow regulator of FIG. 2, and in their place, there is provided the fluid control valve of FIG. 1, which is connected by passages 6 to passages 23 by means of the piping 24. The travel of the operating cylinders, which are not illustrated, is effected by means of the piping 25 and the return travel is effected by means of the piping 26. In both cases the control slide 27 operates to position its control edges in conventional manner so that equal pressure exists in the chambers 28 and 29. Since the openings 5 of the fluid control valve of FIG. 1 are closed in the neutral position of the piston 8, no pressure equalization can occur when travel of the cylinders is interrupted. Thereby, a special locking arrangement which otherwise would be required, is eliminated as unnecessary.

This example illustrates the positive advantages of the invention which mainly lie in the ability to vary the operating velocity of the operating cylinder between wide limits, without the pressure losses which occur in choke devices having fixed choke devices.

Having now described the invention, what we claim as new and desire to secure by Letters Patent is:

1. A fluid control valve, comprising:
    (a) a housing having chamber means therein;
    (b) a first combined fluid pressure and delivery passage communicating with one end of said chamber means;
    (c) a second combined fluid pressure passage and delivery passage communicating with said chamber means at an opening intermediate the ends of said chamber means,
    (d) a third fluid passage intercommunicating said second combined fluid pressure passage and delivery passage with the other end of said chamber means;
    (e) a piston disposed in said chamber means for slidable movement axially of the ends of said chamber means, one end of said piston being disposed in one end of said chamber means, and the other end of said piston being disposed in the other end of said chamber means,
    (f) means biasing said piston to a neutral position in said chamber means;
    (g) said piston having a fourth passage means therein communicating said one end of said chamber means with an opening on the periphery of said piston;
    (h) said piston being operable in response to a predominance of fluid pressure in said first passage over that in said second passage to move axially in one direction in opposition to said biasing means to uncover said opening of said second passage with respect to said one end of said chamber means to an extent sufficient to pass fluid from said one end of said chamber means to said second and third passages and said other end of said chamber means to act with said biasing means upon the other end of said piston with a force balancing the force of said fluid pressure in said first passage means,
    (i) said piston being operable in response to a preponderance of fluid pressure in said other end of said chamber means as provided through said second passage and said third passage, over that in said first passage to move axially in the opposite direction in opposition to said biasing means to uncover said opening of said second passage with respect to said one end of said fourth passage means to an extent sufficient to pass fluid from said second passage through said fourth passage to said one end of said chamber means and said first passage to act with said biasing means upon said one end of said piston with a force balancing the force of said fluid pressure in said other end of said chamber means.

2. The fluid control valve as recited in claim 1, in which a portion of the periphery of said piston, defined at one limit by said one end of said piston and extending axially of the piston to another limit defined by the intersection thereof with the opening of said fourth passage, serves as a slide valve to close said opening to said second passage when said piston is in said neutral position.

3. The fluid control valve as recited in claim 1 in which said biasing means comprises:
    (a) a shaft coaxially attached to the other end of said piston and having an outside diameter smaller than said piston;
    (b) means radially projecting from the distal end of said shaft;
    (c) a pair of discs each having a central aperture slidably receiving said shaft;
    (d) a coil spring encircling said shaft and compressed between said pair of discs to normally urge one of said discs into engagement with said radially projecting means; and
    (e) means normally holding said piston in said neutral portion, said holding means comprising a pair of limit means axially spaced in said chamber means, each axially engaging one of said pair of discs on the side thereof opposite said spring.

References Cited

UNITED STATES PATENTS

| | | | |
|---|---|---|---|
| 1,891,119 | 12/1932 | Stover | 137—493 X |
| 2,690,762 | 10/1954 | Adams | 137—493.7 X |
| 2,989,072 | 6/1961 | Barker. | |
| 3,044,485 | 7/1962 | Adams et al. | 137—493.7 |

M. CARY NELSON, *Primary Examiner.*

R. J. MILLER, *Assistant Examiner.*